United States Patent Office 3,247,218
Patented Apr. 19, 1966

3,247,218
CERTAIN ALKYLIDENE-BIS-OXAZOLIDINONE COMPOUNDS
Richard A. Hickner, Midland, Mich., assignor to The Dow Chemical Company, Midland, Mich., a corporation of Delaware
No Drawing. Filed Mar. 27, 1961, Ser. No. 98,304
5 Claims. (Cl. 260—307)

This invention is concerned with novel compositions of matter and is particularly directed to novel alkylidene-bis-oxazolidinones as hereinafter defined.

In accordance with the present invention there are provided novel 3,3'-alkylidene-bis-2-oxazolidinones having the formula

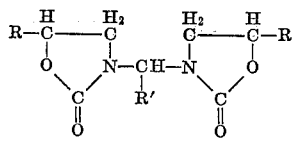

wherein R represents hydrogen, methyl or ethyl and R' represents chloromethyl, phenyl, or an alkyl group containing from two to six carbon atoms. These compounds are crystalline solids substantially insoluble in water and aliphatic hydrocarbons and soluble in benzene and acetone. They have been found useful as modifiers for polyvinyl chloride and as parasiticides, particularly as anthelmintics for the control of intestinal parasites of domestic animals.

The new compounds may be prepared by condensing at least two molar proportions of 2-oxazolidinone or a suitable 5-alkyl-2-oxazolidinone with one molar proportion of an aldehyde having the formula R'CHO, where R' has the significance set forth above. The condensation reaction may be carried out by mixing together the reactants and a catalyst with or without an inert solvent and heating for a period of time to complete the reaction. The reaction proceeds with the elimination of water of reaction. In a preferred method of preparation, the reactants and catalyst are dissolved in a solvent such as benzene or toluene and the reaction mixture heated at the boiling point whereby water is removed by azeotropic distillation from the reaction zone. In such operations, water and accompanying solvent vapors may be condensed, collected, and separated with the solvent being returned to the reaction mixture. On completion of the reaction, unreacted aldehyde may be removed from the mixture by distillation and the desired product recovered by cooling to induce crystallization. Thereafter the reaction product may be further purified by washing and/or recrystallizing in conventional fashion.

Catalysts found effective for the reaction include strong acids, such as sulfuric acid, hydrochloric acid, benzene sulfonic acid and the like, and mercury salts such as mercuric sulfate. A preferred catalyst system is anhydrous hydrogen chloride in a nonaqueous medium. Only minor catalytic amounts of the catalytic agent are needed. Thus, for example, aqueous media may be acidified to about pH 1 or nonaqueous media saturated with anhydrous hydrogen chloride gas.

The following examples illustrate the invention but are not to be construed as limiting the same.

Example 1

A mixture of 101 grams (1.0 mole) of 5-methyl-2-oxazolidinone, 36 grams (0.5 mole) n-butyraldehyde and four grams of mercuric sulfate was heated gradually from 100° to 120° over a four hour period. Condensation occurred with the production of water of reaction. Thereafter, unreacted aldehyde, 5-methyl-2-oxazolidinone and water of reaction were removed by distillation. The product obtained as a residue, solidified on standing. This 3,3'-butylidene-bis-5-methyl-2 - oxazolidinone product weighed 42 grams (33 percent of theory) and melted at 110–112° C. after one recrystallization from ethanol.

Example 2

A mixture of 100 grams of 40 percent aqueous chloroacetaldehyde (0.5 mole) and 101 grams (1.0 mole) of 5-methyl-2-oxazolidinone was acidified to pH=1 with anhydrous hydrogen chloride. The solution was then heated at 90–95° for 3.5 hours. On cooling a precipitate was formed. The precipitated product was collected on a filter and washed with cold ethanol. Upon removal of the water by distillation from the filtrate a second crop of crystalline product was obtained. The total yield was 98 grams or 74 percent of theory. This 3,3'-($\beta$-chloroethylidene)bis-5-methyl-2-oxazolidinone product melted at 136–140° after one recrystallization from absolute ethanol and was found to contain 45.97 percent carbon, 5.44 percent hydrogen, and 10.39 percent nitrogen by analysis, as compared to theoretical values of 45.80 percent carbon, 5.70 percent hydrogen, and 10.68 percent nitrogen calculated for this compound.

Example 3

A solution of 53 grams (0.5 mole) of benzaldehyde and 101 grams (1.0 mole) of 5-methyl-2-oxazolidinone in 100 milliliters of benzene was placed in a 500 ml. flask fitted with a Dean-Stark trap and stirrer. The solution was acidified with anhydrous hydrogen chloride and then heated under reflux until 7.0 milliliters (ca. 80 percent of the theoretical amount) of water had been removed. The brown reaction mixture solidified on cooling. The solid product was collected on a filter and washed with a little cold methanol to give 58 grams of product. The mother liquors were cooled in Dry Ice bath to precipitate a further batch of product. This solid product was treated as before to give an additional 25 grams of product. The total yield was 83 grams or 57 percent of theory. The combined solid fractions were stirred with methanol, cooled, refiltered and dried to produce a purified 3,3'-benzylidene-bis-5-methyl-2 - oxazolidinone product melting at 123–125°. This product contained 62.50 percent by weight of carbon by analysis as compared with 62.10 percent carbon calculated from theory.

In a similar fashion, propionaldehyde is reacted with two molar proportions of 2-oxazolidinone to produce 3,3'-propylidene-bis-2-oxazolidinone as a crystalline solid and chloroacetaldehyde is reacted with 2 molar proportions of 5-ethyl-2-oxazolidinone to produce 3,3'-($\beta$-chloroethylidene)-bis-5-ethyl-2-oxazolidinone as a crystalline solid having a molecular weight of 290.5.

In representative operations, small amounts of compounds of the invention were mixed with animal feed and the resulting compositions fed as the sole ration to mice infested with tapeworms or pig ascarids for a period of one week. During this period the feces were collected and investigated microscopically for tapeworm segments and ova. Thereafter the mice were sacrificed and autopsied to determine control of ascarids. Typical results are summarized in the following table, wherein the concentration is the percent by weight of the test compound incorporated in the feed composition.

TABLE I

| Compound | Organism | Concentration | Percent Kill |
|---|---|---|---|
| 3,3'-butylidene-bis-5-methyl-2-oxazolidinone. | Pig ascarids | 0.12 | 75 |
| 3,3'-($\beta$-chloroethylidene)bis-5-methyl-2-oxazoilidinone. | Tapeworms | 0.50 | 100 |
|  | Pig ascarids | 0.25 | 58 |
| 3,3'-(benzylidene)bis-5-methyl-2-oxazolidinone. | Tapeworms | 0.25 | 100 |
|  | Pig ascarids | 0.25 | 67 |

I claim:
1. A compound of the formula

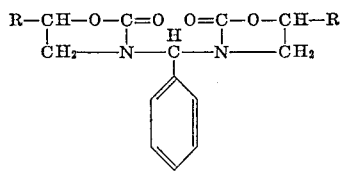

where R is a member of the group consisting of hydrogen and methyl and the compound is symmetrical.
2. 3,3'-(β-chloroethylidene)-bis - 5 - methyl-2-oxazolidinone.
3. 3,3'-benzylidene-bis-5-methyl-2-oxazolidinone.
4. 3,3'-(β-chloroethylidene)-bis-5-ethyl-2-oxazolidinone.
5. 3,3'-(β-chloroethylidene)-bis-2-oxazolidinone.

References Cited by the Examiner
UNITED STATES PATENTS 2,713,051 7/1955 Walter et al.
2,973,366 2/1961 Bimber _____ 260—307.3

OTHER REFERENCES

Breitenbach et al., Chem. Abstracts, vol. 50, col. 12972 (1956).
Breitenbach et al., Chem. Abstracts, vol. 51, col. 4355-7 (1957).
Delaby, Chem. Abstracts, vol. 47, col. 8654 (1953).
Delaby et al., Chem. Abstracts, vol. 50, col. 9382 (1956).
Wang, "Ph.D. Dissertation, Synthesis of Bis-Benzimidazoles as Potential Antimetabolites," pp. 1–13, Univ. Microfilms, Ann Arbor, Mich.

NICHOLAS S. RIZZO, *Primary Examiner.*

IRVING MARCUS, DUVAL T. McCUTCHEN,
*Examiners.*